United States Patent [19]

Suzuki et al.

[11] Patent Number: 5,594,922
[45] Date of Patent: Jan. 14, 1997

[54] SYSTEM FOR MONITORING A LIBRARY UNIT SHARED AS INPUT/OUTPUT WITH HIGHER LEVEL UNIT WHEREIN ABNORMAL OCCUPATION OF LIBRARY BY A HIGHER LEVEL UNIT IS RESET

[75] Inventors: Yoshio Suzuki, Kawasaki; Naoyuki Takeda, Kato-gun, both of Japan

[73] Assignee: Fujitsu Limited, Japan

[21] Appl. No.: 301,128

[22] Filed: Sep. 6, 1994

[30] Foreign Application Priority Data

Dec. 13, 1993 [JP] Japan .................................. 5-311447

[51] Int. Cl.$^6$ .................................................. G06F 13/10
[52] U.S. Cl. ...................... 395/837; 395/287; 364/238.3; 364/240; 364/230; 364/232.9
[58] Field of Search .................. 395/200.11, 200.02, 395/200.07, 441, 600, 200.01, 800, 275, 375, 250, 425, 725, 500, 700, 650, 287, 837; 364/230, 238.3, 232.9, 240

[56] References Cited

U.S. PATENT DOCUMENTS

| | | | |
|---|---|---|---|
| 4,276,593 | 6/1981 | Hansen | 364/119 |
| 5,283,872 | 2/1994 | Ohnishi | 395/325 |
| 5,386,545 | 1/1995 | Gombos, Jr. et al. | 395/575 |
| 5,454,083 | 9/1995 | Choi | 395/285 |

FOREIGN PATENT DOCUMENTS 04359353  12/1992  Japan .

Primary Examiner—Thomas C. Lee
Assistant Examiner—Anderson I. Chen
Attorney, Agent, or Firm—Greer, Burns & Crain, Ltd.

[57] ABSTRACT

A plurality of higher-level units are connected to a library unit, for example, as a lower-level unit through an SCSI. Furthermore, the plurality of higher-level units are connected by means of a communication path to mutually exchange information regarding the status of use of SCSI for the access to the lower-level library unit. A monitoring control section is provided in each of the plurality of higher-level units to instruct necessary processing in response to the status of use of SCSI. Particularly, when an abnormal occupation of SCSI caused by hang-up of any other higher-level unit is detected by the monitoring control section of a higher-level unit, the higher-level unit instructs its own SCSI controller to reset the bus to achieve bus reset of the other SCSI controller, thus releasing the occupation.

15 Claims, 13 Drawing Sheets

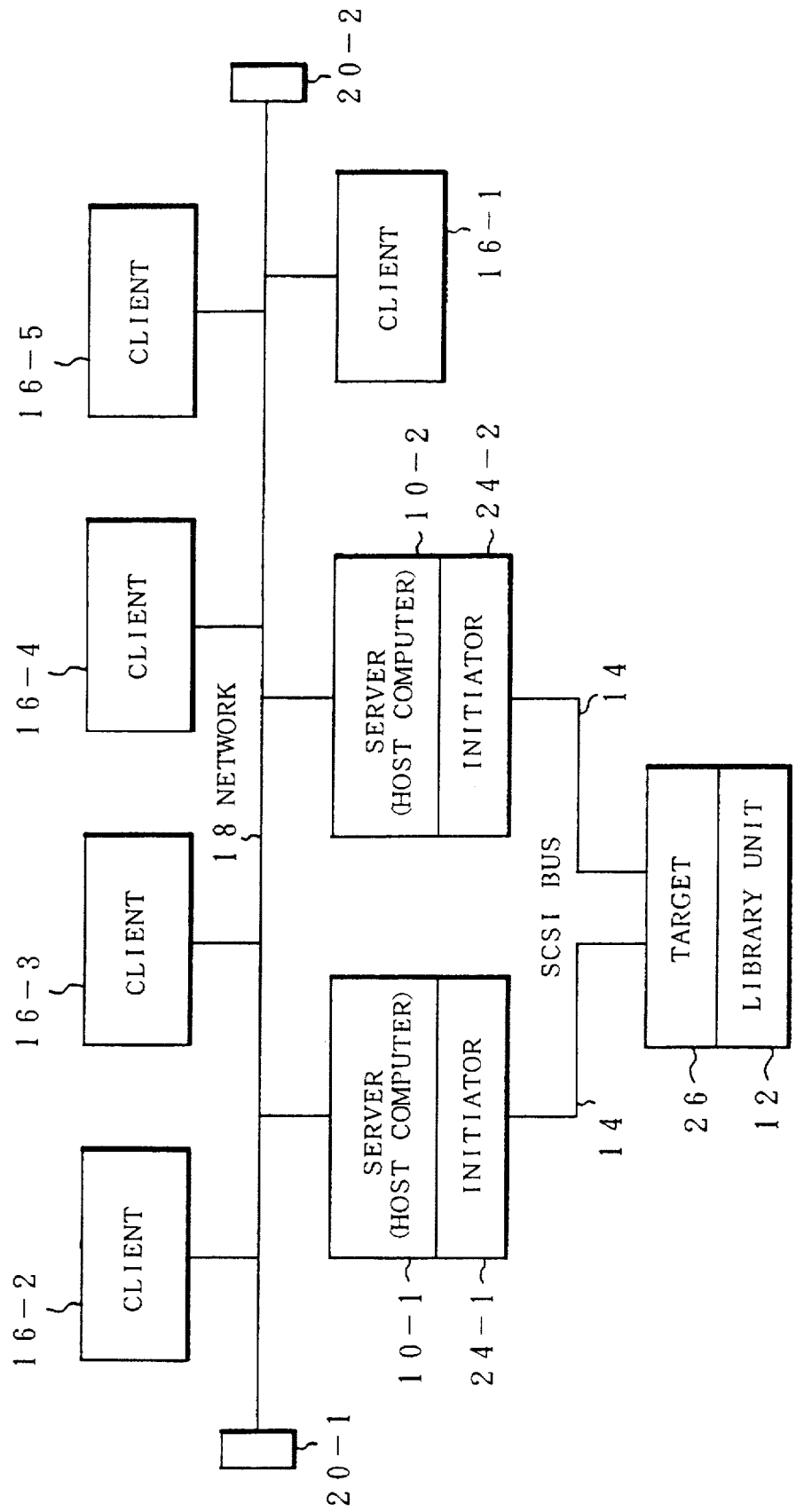

1

SYSTEM FOR MONITORING A LIBRARY UNIT SHARED AS INPUT/OUTPUT WITH HIGHER LEVEL UNIT WHEREIN ABNORMAL OCCUPATION OF LIBRARY BY A HIGHER LEVEL UNIT IS RESET

BACKGROUND OF THE INVENTION

The present invention relates to a data processing system for sharing a library unit in a multi-initiator environment such as a plurality of host computers or servers, and more particularly, it relates to a data processing system composed by connecting a library unit to host computers by means of SCSI (Small Computer System Interface).

As an input/output system for a multi-computer system or a server client system, a library unit permitting storage and utilization of data in a large volume is usually employed. As an interface for such a library unit shared by a plurality of higher-level units, a block multiplexer channel interface (MBC interface) prepared for channel input/output for host computers has conventionally been utilized. Along with the recent tendency toward downsizing host computers and popularity of server client systems using workstations, an SCSI adopted as ANSI X3. 131-1986 is used as the interface for a library unit to allow expansion of the scope of higher-level units and library units composing a system.

FIG. 1 shows a conventional system using an SCSI. A library unit 110 is connected by means of an SCSI bus 120 to host computers 100-1 and 100-2 as higher-level units. In this case, SCSI controllers 130-1 and 130-2 of the host computers 100-1 and 100-2 serve as initiators, and an SCSI controller 180 of the library unit becomes a target.

FIG. 2 is a detailed view of FIG. 1: the host computers 100-1 and 100-2 are provided with SCSI controllers 130-1 and 130-2, data processing sections 140-1 and 140-2, terminal processing sections 150-1 and 150-2 and data terminal equipment 160-1 and 160-2. On the other hand, the library unit 110 is also provided with an SCSI controller 180 which is connected to the SCSI controllers 130-1 and 130-2 on the host side through an SCSI bus 120 comprising nine data lines and nine control lines, the number nine being obtained by adding parity one bit to eight bits.

However, when connecting the library unit to a plurality of host computers by means of such SCSIs, if the library is in use by one of the host computers, the other computer, even if desiring to use the library, is refused as busy by the SCSI controller of the library unit. When the host computer using the SCSI controller of the library unit as the target hangs up for some reason or other, the only response the other computer desiring to use the library receives is a busy response, and no processing can be performed until the bus is reset.

Now, an SCSI unit becoming unabled as a result of hang-up of a host computer is described in detail. First, FIG. 3A represents a state in which the host computers 100-1 and 100-2 are not processing. Then, when a request for input/output to the library unit 110 takes place in the host computer 100-2, as shown in FIG. 3B, the host computer 100-2 occupies the SCSI controller 180 of the library unit 110 serving as the target, and proceeds to perform input/output processing. In this state, it is assumed that the host computer 100-2 hangs up for some reason or other and discontinues processing as shown in FIG. 3C. The SCSI controller 180 of the target library unit 110, continues to determine that the hung-up host computer 100-2 is still processing, since a processing break signal was never received. The controller 180 therefore refuses the access request from the host computer 100-1 with a busy response busy as shown in FIG. 3D. When a busy response is the only response received for a long period of time, it is conceivable that this state is caused by hang-up as a result of an abnormality in the other host computer, and a reset signal is sent from an SCSI controller provided in the host computer 100-1 to all the other SCSI controllers to reset the bus to forcedly bring them back to their initial state.

However, if the other host computer, erroneously determines that the SCSI bus is unduly occupied under the effect of hang-up of the occupying computer, and performs a bus reset while large-sized data normally transmitted or received for a long period of time, is being transmitted or received a forced interruption of the transfer may destruct data. Particularly when a library unit is connected through a server to host computers, a large volume of data is often transferred from the server to the library unit, and in such a case, it is not rare that the library unit is occupied for more than three or four hours.

SUMMARY OF THE INVENTION

According to the present invention, there is provided a data processing system for sharing a library unit, which detects an undue occupation of the SCSI to the library unit as a result of an abnormality in a higher-level unit for an appropriate action.

The present invention covers a data processing system, provided under a plurality of higher-level units, which exchanges data through connection with a library unit shared as an input/output unit by means of a lower-level interface. As this lower-level interface, an SCSI comprising an SCSI bus with the higher-level unit side as the initiator, and with the library unit as the target, and an SCSI controller is used.

As a data processing system for sharing such a library unit, the present invention permits mutual exchange of information regarding the status of use of the library unit by connecting a plurality of higher-level units by means of higher-level communication units. At the same time, a monitoring control section is provided, which instructs the SCSI controller for each of the plurality of higher-level units to perform necessary processing in response to the status of use of the library unit acquired by the use of the higher-level communication unit.

The monitoring control section provided for each of the high-level units instructs the SCSI controller, when recognizing undue occupation of the library unit by any other higher-level unit, to reset the occupied state of a lower-level interface.

Upon issuance of an input/output request to the library unit, the monitoring control section of each higher-level unit determines whether or not any other higher-level unit currently occupying the library unit is accessing the same medium. If the other higher-level unit is accessing the same medium, an interruption request is issued to the other higher-level unit, and when interruption is enabled, an interruption processing of the input/output request to the same medium is performed to the library unit.

When receiving an interruption request for accessing the same medium from the other higher-level unit during occupation of the library unit, the monitoring control section of each higher-level unit responds, when continuing processing of the same medium, interruption disabled to the other higher-level units, and when terminating processing, responds interruptable.

When receiving a transfer request from the other higher-level unit, the higher-level communication unit of each higher-level unit transmits information showing the status of use of the library unit by itself. The higher-level communication unit for each higher-level unit may transfer information showing the status of use by itself to all the other higher-level units every time it issues an input/output request to the library unit.

The higher-level communication unit for a higher-level unit may use a communication network built by mutually connecting a plurality of higher-level units as communication terminals, or may use a special communication network.

The higher-level unit of the present invention is a server unit of a server client system built by connecting one or more client units and a plurality of server units by means of a network. The higher-level units may be host computers using a library as a common input/output system.

The library unit is provided with at least one or more recording/reproducing units, a cell block storing a plurality of storage media, and a changer mechanism carrying and exchanging storage media between the recording/reproducing unit and the cell block. The library unit may be a magnetic tape library system using a magnetic tape cartridge as a storage medium or an optical disk library system using an optical disk cartridge.

According to the data processing system of the present invention, it is possible to mutually recognize, by the use of a network or the like, the status of an SCSI system shared by a plurality of higher-level units serving as initiators such as servers or host computers. It is therefore possible, relative to a busy response from a lower-level SCSI controller, accurately detect the status as to whether any other higher-level unit is always performing processing or hangs up, and release undue occupation, if caused by hang-up, through bus resetting. It is also possible to avoid such an inconvenience of executing bus resetting on the basis of a wrong determination of data transfer continued for a long period of time to be hang-up.

The above and other objects, features, and advantages of the present invention will become more apparent from the following detailed description with reference to the drawings.

BRIEF DESCRIPTION OF THE DRAWINGS

FIG. 4 is a block diagram of the present invention covering a server client system;

DETAILED DESCRIPTION OF THE PREFERRED EMBODIMENTS

Figure 1:
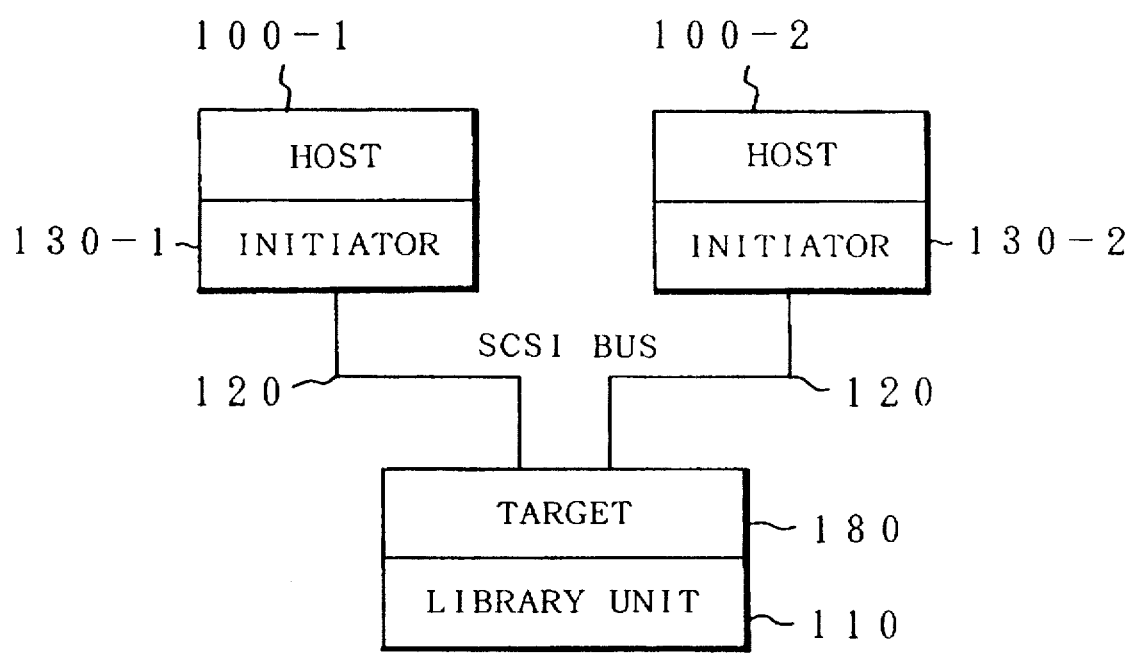
FIG. 1 is a block diagram of a conventional system.
Figure 2:
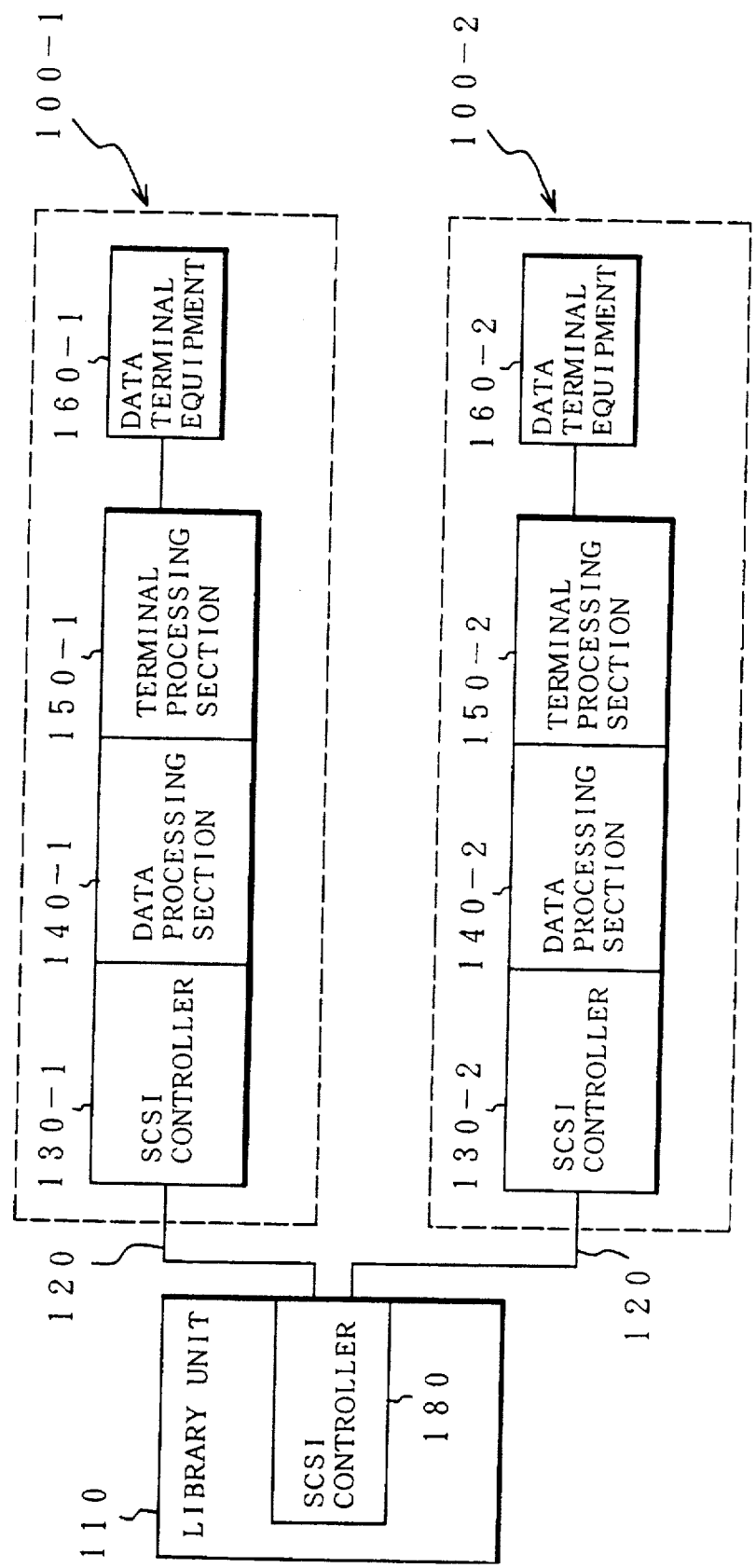
FIG. 2 is a detailed block diagram of FIG. 1.
Figure 3A:
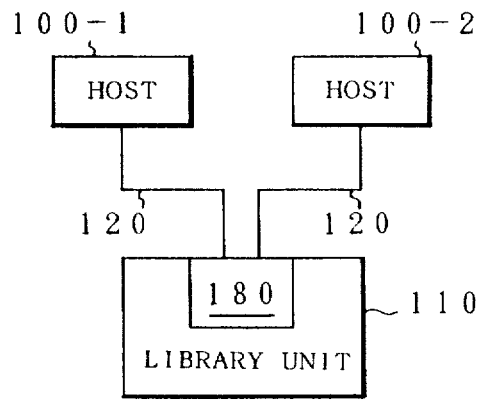
FIGS. 3A to 3D are descriptive views of the conventional processing procedure upon host hang-up.
Figure 3B:
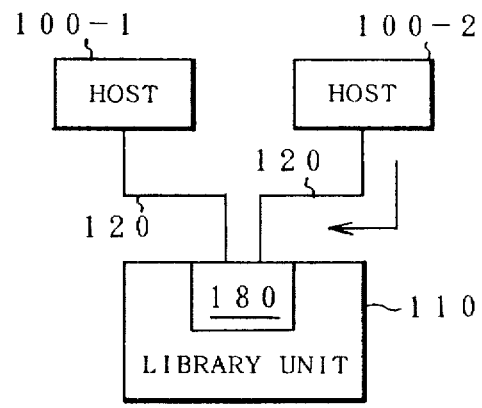
Figure 3C:
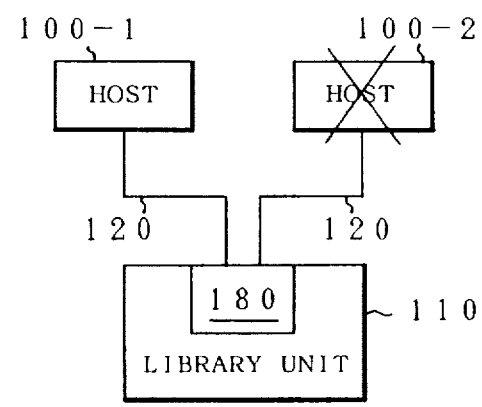
Figure 3D:
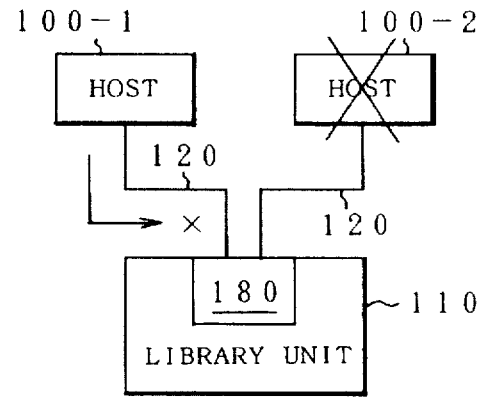

FIG. 4 is a server client system to which the present invention is applied. In this server client system, five client units 16-1 to 16-5 and two server units 10-1 and 10-2 are connected to a network 18. Terminal resistances 20-1 and 20-2 are provided at the both ends of the network 18. A library unit 12 is provided as an input/output unit shared by the server units 10-1 and 10-2. For the connection of the library unit 12 to these server units 10-1 and 10-2, the present invention uses an SCSI system.

In the SCSI system, SCSI controllers 24-1 and 24-2 are provided for the server units 10-1 and 10-2, respectively, and an SCSI controller 26 is provided also for the library unit 12. The SCSI controllers 24-1, 24-2 and 26 are connected by means of a SCSI bus 14. As the SCSI system, one in conformity to ANSI X3. 131-1986 is employed, for example.

In this server client system, the server units 10-1 and 10-2 receive an input/output request through the network 18 from any of the client units 16-1 to 16-5, and execute input/output of data to and from the library unit 12. For this purpose, the SCSI controllers 24-1 and 24-2 provided in the server units 10-1 and 10-2 become initiators, and the SCSI controller 26 provided in the library unit 12 becomes the target. It is needless to mention that initiator and target functions in the SCSI controllers are not fixed ones, but when processing is requested to the server units 10-1 and 10-2 from the library unit 12 side, for example, the SCSI controller 26 of the library unit 12 becomes in contrast the initiator, and the SCSI controllers 24-1 and 24-2 on the server units 10-1 and 10-2 side become targets. In normal processing, the server units 10-1 and 10-2 serve as initiators and the library unit 12 serves as the target.

The SCSI bus 14 is composed of eight data lines, a data parity line, and nine control lines. The control line signals in the SCSI bus 14 are as follows:

I. A request signal REQ and an acknowledge signal ACK for controlling the timing of data transfer;

II. A message signal MSG, a select signal SEL, a control/data signal (C/D) and an input/output signal (I/O) for determining the manner of use of the data bus;

III. Other signals including a busy signal BSY, an attention signal ATN and a reset signal RST.

The SCSI bus 14 has four phases: bus-free phase, arbitration phase, selection phase and data transfer phase. The bus-free phase represents the initial state in which the SCSI bus 14 is not used by any unit. The arbitration phase is to determine the use right of the SCSI bus 14 accessible only from the bus-free phase. The selection phase is to select a target to be hereafter used by the initiator having won in the arbitration. The data transfer phase has four sub-phases: command, data, status and message, and executes data transfer by the use of a six-byte command desctiptor block comprising predetermined command codes and a parameter list.

The reset signal RST can be sent at any time from all the SCSI controllers. All the SCSI controllers having detected a reset signal RST discontinue their use of the SCSI bus. Reset for discontinuing the use of the bus by detecting a reset signal RST is either by hardware reset or software reset. In hardware reset, the status is brought back to the initial state upon detection of a reset signal RST. In software reset, the bus is released while storing the current status and how far the pending command has been executed, upon detection of a reset signal RST. The reset function used in the present invention may be any of hardware reset and software reset.

Figure 5:
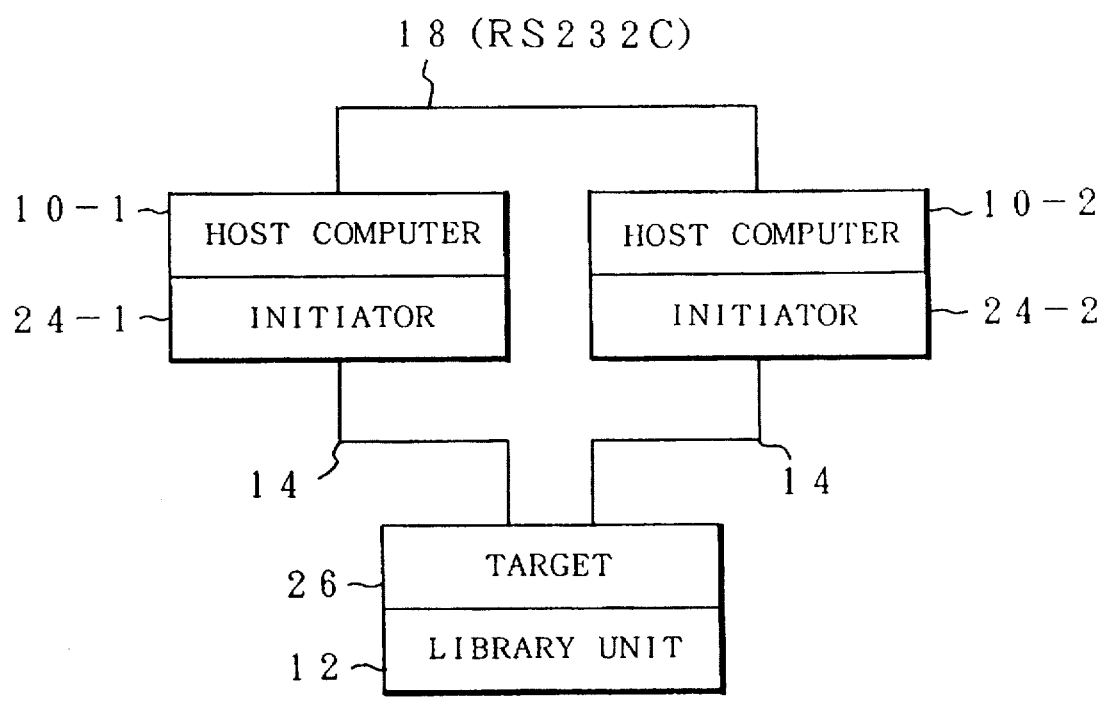
FIG. 5 is a block diagram of another embodiment of the present invention in which a special inter-host communication path is provided.

FIG. 5 shows another data processing system to which the present invention is applied. In this case, a library unit 12 is provided as a shared input/output unit under the control of host computers 10-1 and 10-2. SCSI controllers 24-1 and 24-2 serving as initiators are provided in the host computers 10-1 and 10-2, respectively, and an SCSI controller 26 serving as the target is provided in the library unit 12. Each of the SCSI controllers 24-1, 24-2 and 26 is connected by an SCSI bus 14. As the communication network 18 between the most computers 10-1 and 10-2, an RS232C is provided, for example, as a special network. In this system configuration shown in FIG. 5 also, the relationship between the server units 10-1 and 10-2 and the library unit 12 in the server client unit system shown in FIG. 4 is used without any modification in the system configuration of FIG. 5.

Figure 6:
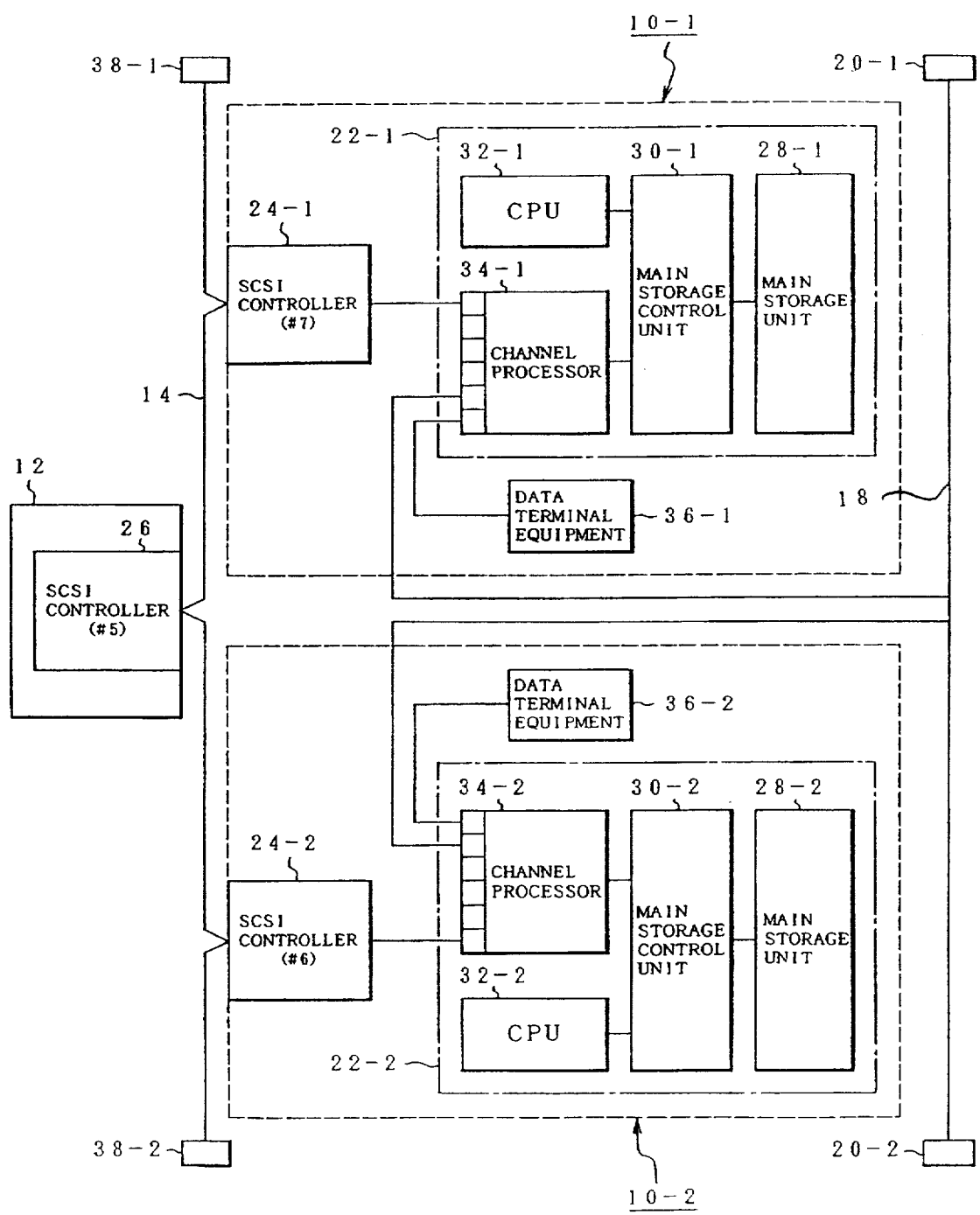
FIG. 6 is a block diagram of the server of FIG. 4.

FIG. 6 shows hardware of the server units 10-1 and 10-2 shown in FIG. 4. In the case of the server unit 10-1, for example, a processor element 22-1 is provided in the interior. The processor element 22-1 comprises a main storage unit 28-1, a main storage control unit 30-1, a CPU 32-1, and a channel processor 34-1. The SCSI controller 24-1 is connected to a channel of the channel processor 34-1. A data terminal equipment 36-1 and a network 18 are connected to another channel of the channel processor 34-1.

The server unit 10-2 is similarly provided with a processor element 22-2. The processor element 22-2 comprises a main storage unit 28-2, a main storage control unit 30-2, a CPU 32-2 and a channel processor 34-2. The SCSI controller 24-2 is connected to a channel of the channel processor 34-2, and a data terminal equipment 36-2 and the network 18 are connected to another channel thereof.

The SCSI controllers 24-1 and 24-2 provided in the server units 10-1 and 10-2 are connected through the SCSI bus 14 to the SCSI controller 26 provided in the library. As shown in FIG. 4, the SCSI controllers 24-1 and 24-2 of the server units 10-1 and 10-2 serve as initiators, and the SCSI controller 26 of the library unit 12 serves as a target. Predetermined IDs are assigned to the SCSI controllers 24-1, 24-2 and 26. Up to eight SCSI controllers can be connected to an SCSI system, and #0 to #7 can be used as IDs. The ID determines the priority in bus arbitration, the highest priority being ID#7 and the lowest, ID#0.

In the case shown in FIG. 6, comprising three SCSI controllers, ID#7 is assigned to the SCSI controller 24-1, ID#6, to the SCSI controller 24-2, and ID#5, to the SCSI controller 26.

Figure 7:
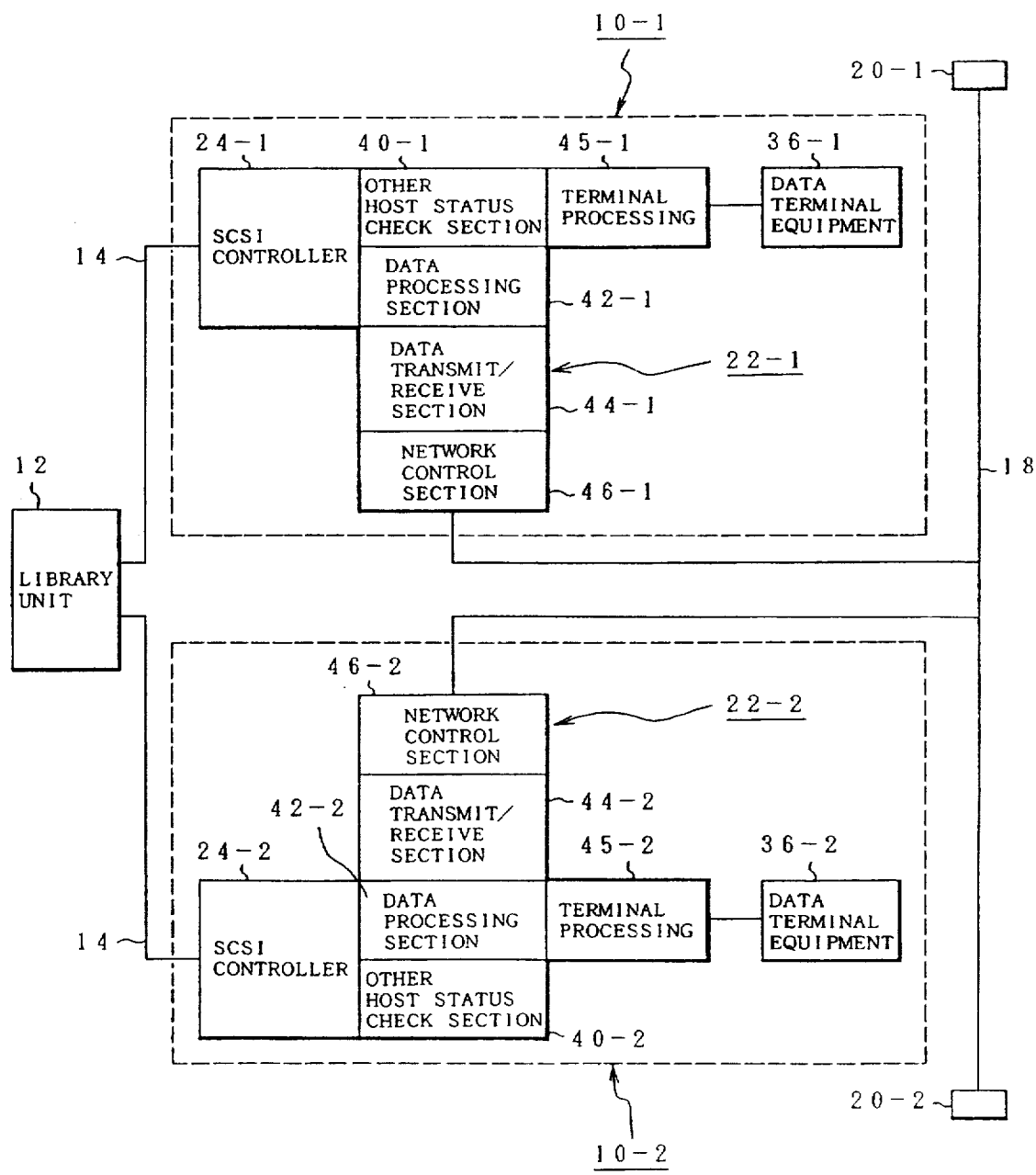
FIG. 7 is a block diagram of processing functions of the server of FIG. 6.

FIG. 7 shows the processing functions of the server units 10-1 and 10-2 achieved by the hardware. In the case of the server unit 10-1, for example, it serves as the monitoring control section by the presence of the processor element 22-1, and there is provided a status check section 40-1 which monitors and controls the status of use of the library unit 12 by the other server unit 10-2. A data processing section 42-1, a data transmission/receiving section 44-1 and a network control section 46-1 are provided. A terminal processing section 45-1 is provided as a processing section for the data terminal equipment 36-1. The SCSI controller 24-1 is under input/output control by the data processing section 42-1 of the processor element 22-1. During this input/output control, the SCSI controller 24-1 is further subjected to necessary processing on the basis of results of detection of the status of use of the library unit 12 by the other server unit 10-2, as detected by the status check section 40-1.

The data transmission/receiving section 44-1 and the network control section 46-1 perform data communication with the other server unit 10-2 and the client units.

The status check section 40-1 serving as monitoring control means can recognize the status of access to the library unit 12 by the data processing section 42-2 of the other server unit 10-2 using the SCSI controller 24-2 through the network 18.

Detection of the status of use of the library unit 12 by the other server, as conducted by the status check section 40-1 comprises causing transfer of necessary information by interrupting from the status check section 40-1 to the other server unit 10-2, as in the first embodiment, or transferring the status to all the other servers every time an input/output request to the library unit 12 is issued by the data processing section 40-1, as in the second embodiment. Similarly, the processor element 22-2 on the server unit 10-2 side is also composed of a status check section 40-2, a data processing section 42-2, a network control section 46-2 and a terminal processing sect ion 45-2.

Figure 8:
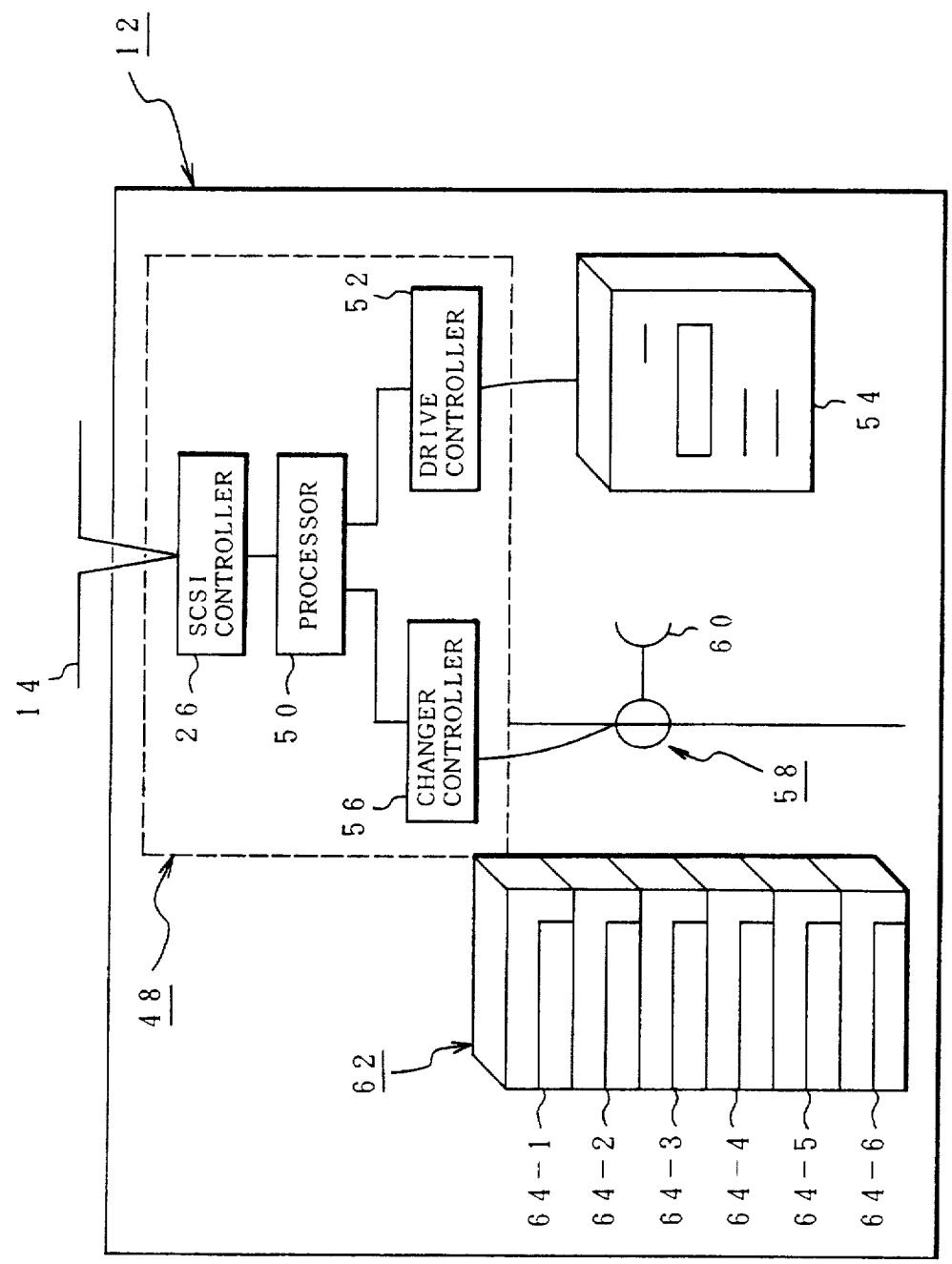
FIG. 8 is a descriptive view of the hardware and the mechanisms of the library unit of FIG. 4.

FIG. 8 gives an outline of the hardware and mechanisms of the library unit 12. An input/output control section 48 is provided in the library unit 12. The input/output control section 48 is composed of an SCSI controller 26 serving as a target, a processor 50, a drive controller 52 and a changer controller 56. The processor 50 receives a command from a higher-level server through the SCSI controller 26, and performs read/write of data by drive controller 52 and transfer control of the storage medium by the changer controller 56, in compliance with the received command. A drive unit 54 is provided under the drive controller 52. The drive unit 54 has one or more built-in drive units such as magnetic tape units or optical disk units. A changer 58 provided under the changer controller 56 is a transfer robot mechanism provided with a robot hands 60. This changer 58 picks up, by means of the robot hands 60, a medium specified by the command from among storage media 64-1 to 64-6 such as a magnetic tape cartridge or an optical disk cartridge, cart led it to the drive unit 54, loads it thereon, and causes the drive controller 52 to perform read or write operation. Upon completion of read or write operation by the drive unit 54, the processed medium cartridge is discharged, in accordance with an unload instruction from the drive controller 52, from the drive unit 54, picked up by the robot hands 60, and brought back to the original position in the cell block 62.

Figure 9:
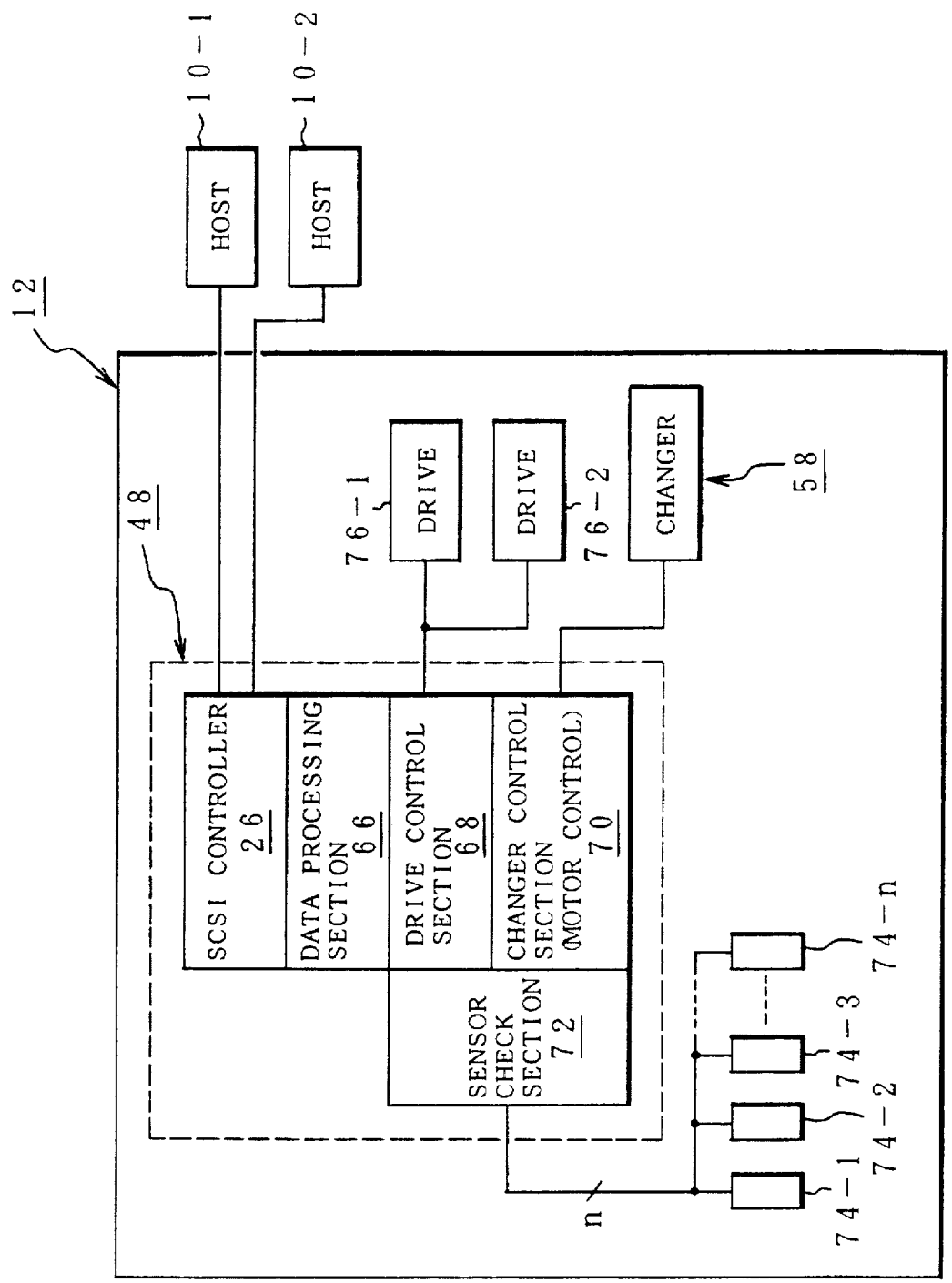
FIG. 9 is a block diagram of processing functions of the library unit of FIG. 8.

FIG. 9 is a block diagram of functions of the library unit 12 shown in FIG. 8. In the input/output control section 48, functions of a data processing section 66, a drive control section 68, a changer control section 70 and a sensor check section 72 are achieved by the processor 50, the drive controller 52 and the changer controller 56 shown in FIG. 8. The data processing section 66 decodes a command received from a higher-level server through the SCSI controller 26, and gives an instruction to the drive control section 68 or the changer control section 70. The kinds of command received by the data processing section 66 in normal read/write processing are as follows:

I. Move command for moving a medium cartridge from the cell block 62 to the drive unit 54;

II. Load command for loading a moved medium cartridge onto the drive unit 54;

III. Read/write command for instructing read or write of a loaded medium cartridge;

IV. Unload command for causing discharge of the medium cartridge from the drive unit 54;

V. Another move command for bringing the discharged medium cartridge to the original position thereof in the cell block 62.

The drive control section 68 in this embodiment controls two drives 76-1 and 76-2 provided in the drive unit 54. A plurality of sensors 74-1 to 74-n are provided for the sensor check section 72. The sensors 74-1 to 74-n include a sensor for detecting the position of medium transfer control of the changer 58, a sensor for detecting a medium cartridge in the cell block 62, a sensor for indicating insertion, loading or inject of a medium in the drive unit 54, and a sensor for detecting the travelling position of the robot hands 60 in the changer 58. As this library unit 12, for example, F6455 magnetic tape library system, F6456 magnetic tape library unit, or F7445 optical disk library system, all manufactured by Fujitsu Limited is applicable. It is needless to mention that the library unit is not limited to these library systems, but an appropriate library unit may well be applicable so far as it permits application of SCSI systems.

Figure 10:
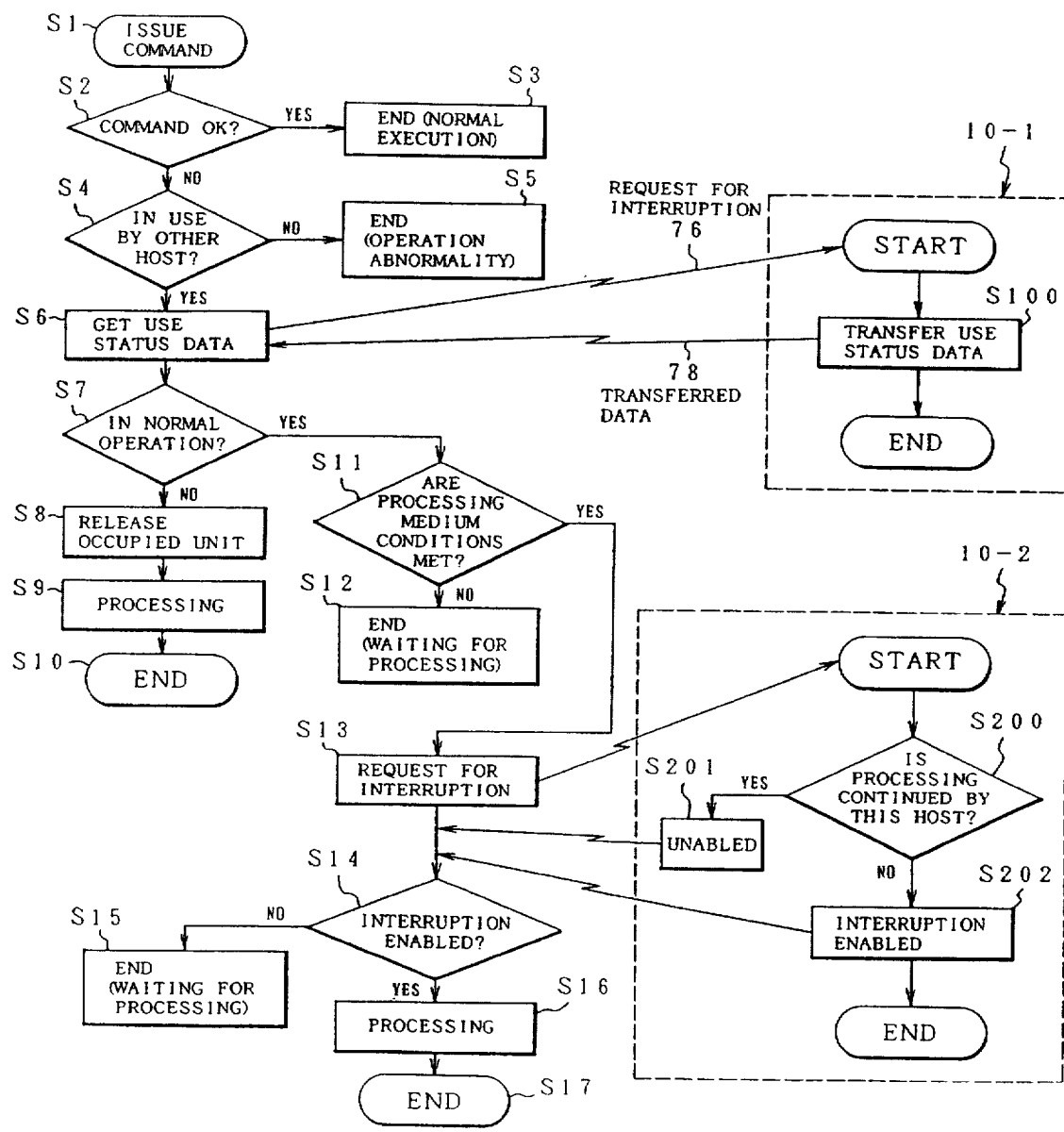
FIG. 10 is a flowchart of a first embodiment of the monitoring control processing in the present invention.

The flowchart shown in FIG. 10 represents processing operations in the first embodiment of the present invention. The first embodiment is characterized in that, when the host computer 10-1 serving as a server makes an input/output request to the library unit 12, and receives a busy response from the SCSI controller 26, an interruption is made to the other host computer 10-2 to request transfer of data showing the status of use of the library unit 12.

In FIG. 10, the host computer 10-1 issues a command for input/output request at Step S1. Upon issuance of this command, the SCSI controller 24-1 of the host computer 10-1 confirms that the SCSI bus 14 is free, and then outputs the ID#7 thereof and a busy signal BSY to the SCSI bus 14 for occupation. Then at the selection phase, the SCSI controller 26 of the library unit 12, which is the target for its use, is selected. More specifically, the SCSI controller 24-1 as the initiator first issues a busy signal BSY and a select signal SEL for a certain period of time, then turns the busy signal off, outputs ID#5 to the SCSI controller 26 of the library unit 12, which is the target to be selected, and then, turns the busy signal BSY off. At the point when the busy signal BSY of the SCSI bus 14 has been turned off, the SCSI controller 26 of the target, if recognizing that its own ID#5 is valid, responds with output of a busy signal BSY. Upon confirmation of the response of busy signal BSY from the SCSI controller 26 by the SCSI controller 24-1, the SEL signal is turned off and the selection phase comes to an end.

Then, in the command phase, the SCSI controller 24-1 sends command codes and the parameter list to the SCSI controller 26 through the SCSI bus 14 currently occupied, and performs write operation or read operation using the library unit 12. In this case, when it takes much time from issuance of the command by the host computer 10-1 up to response by the library unit 12, a disconnect processing is performed. More specifically, when it takes much time for the SCSI controller 26, the target, to execute a command from the initiator, the connection is once disconnected, and upon end of processing by the library unit 12, connection is made again to conduct the following processing.

It is checked up, at Step S2, whether or not the command issued at Step S1 from the host computer 10-1 to the library unit 12 has been normally executed, and if normally executed, processing proceeds to Step S3 for normal termination. On the other hand, when, against the issuance of the command at Step S1, the other host computer 10-2 is already using the SCSI bus 14, and a busy response is received, it is checked up if the other host computer 10-2 is using the bus 14 at Step S4. As a result of checkup at Step S4, the SCSI bus 14 is not used by the other host computer 10-2, it is determined that there is an abnormality in the host computer 10-1, and processing is abnormally terminated at Step S5.

When the other host computer 10-2 is using the bus 14, at Step S4, data acquisition processing of the status of use is performed at Step S6. This data acquisition processing of the status of use comprises first issuing an interruption request 76 for transfer of the status of use data to the other host computer 10-2 currently using the library 12 with the use of the network 18. Upon receipt of the interruption request 76, the other host computer 10-2 starts interruption operation, and at Step S100, transfers the status of use data regarding SCSI currently in use by itself including such data as command and status to the host computer 10-1 having issued the interruption request. Thus, the host computer 10-1 can acquire the status of use data regarding the status of us of the library unit 12 by the other host computer 10-2 at Step S6.

The host computer 10-1 having acquired the use status data from the computer 10-2 checks up whether or not the other host computer 10-2 is in normal operation at Step S7. At this point, if the other host computer 10-2 is determined to have an abnormality and hang up for some reason or other, the occupied SCSI controller is released at Step S8. That is, the host computer 10-1 instructs its own SCSI controller 24-1 to issue a reset signal RST. Upon detection of the reset signal RST from the SCSI controller 24-1 by all the other SCSI controllers 24-2 and 26, use of the SCSI bus is forcedly released. After thus releasing the occupied SCSI controller 26, the processing based on the command issued at Step S1 is executed for the library unit 12 at Step S9, and a series of operations end at Step S10. When the other host computer 10-2 is determined to be in normal operation at Step S7, on the other hand, conditions of the medium cartridge currently under processing by the other host computer 10-2 are checked up at Step S11. This is to check as to whether or not the processed medium currently covered by the issuance of command by the host computer 10-1 is the same as the medium currently processed by the host computer 10-2. If not the same, a series of operations come to an end at Step S12, and the end of processing of the library unit 12 is waited for.

If the same medium, an interruption request to use the same medium is issued at Step S13 to the other host computer 10-2 which is currently using the same medium. Upon receipt of the interruption request from the host computer 10-1, the other host computer 10-2 starts interruption processing, and checks up if it is to continue processing for the same medium at Step S200. If processing is to be continued, a response of interruption disabled is given to the host computer 10-1 at Step S201. If not continuing, on the other hand, an authorization of interruption is issued to the host computer 10-1 at Step S202. Upon completion of read/write processing of a medium, it is the usual practice for the host computer 20-1 to issue unload and move commands to return the medium from the drive to the cell block. In the case described here, the host computer 10-2 finishes its own processing to pass the loaded medium to interruptive read/write processing by the host computer 10-1.

The host computer 10-1 having issued the interruption request at Step S13 checks up whether or not the response from the other host computer 10-2 is an authorization of interruption at Step S14. If not authorized, processing comes to an end for waiting for processing of the library unit 12 at Step S15. If authorized, the SCSI controller 26 is acquired at Step S16, and immediately write or read processing is performed for the library unit 12.

In an ordinary input/output processing, a read command or a write command is issued after issuance of a move command for transferring the medium from the cell block to the drive, and issuance of a load command upon knowing the status of transfer completion. In the present case, however, the medium has already been loaded onto the drive and is ready for read/write for the processing by the host computer 10-2. A read or write command can therefore be issued to the library unit 12 immediately after acquisition of the SCSI controller 26. Upon completion of read or write operation, an unload command and a move command are sequentially issued to return the processed medium to the original position of the cell block, and a series of operations are completed at Step S17.

Figure 11A:
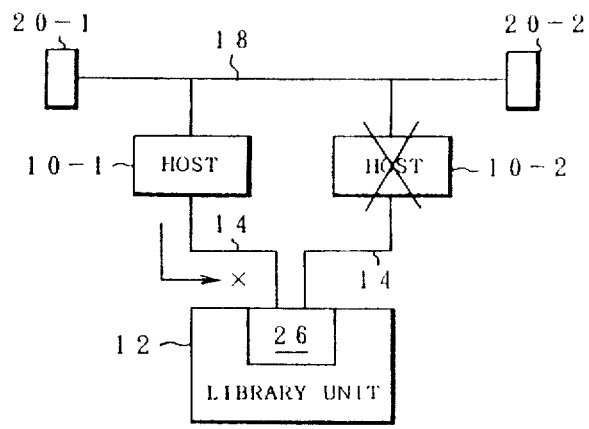
FIGS. 11A to 11d are descriptive views of the processing procedure of the present invention upon host hang-up.
Figure 11B:
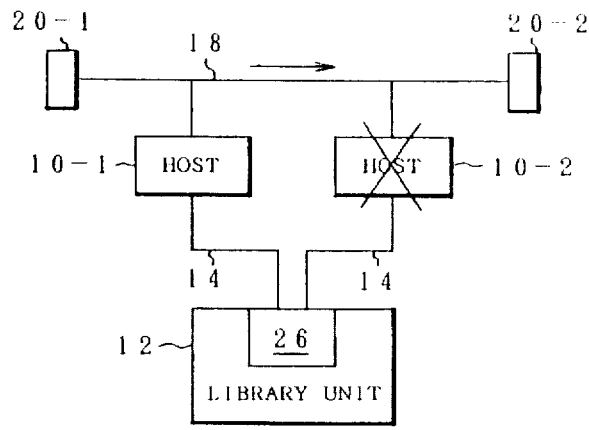

Now, the processing procedure in the case where the host computer 10-2 hangs up during processing of the first embodiment shown in FIG. 10. FIG. 11A shows a state in which the host computer 10-2 hangs up for some reason or other while occupying the SCSI controller 26 of the library unit 12. A processing request to the SCSI controller 26 of the library unit 12 from the host computer 10-1 in this state would be refused in the form of a response busy. The host computer 10-1 therefore request the hanging-up host computer 10-2 to transfer data regarding use status of the SCSI controller by the use of the network 18, as shown in FIG. 11B.

Figure 11C:
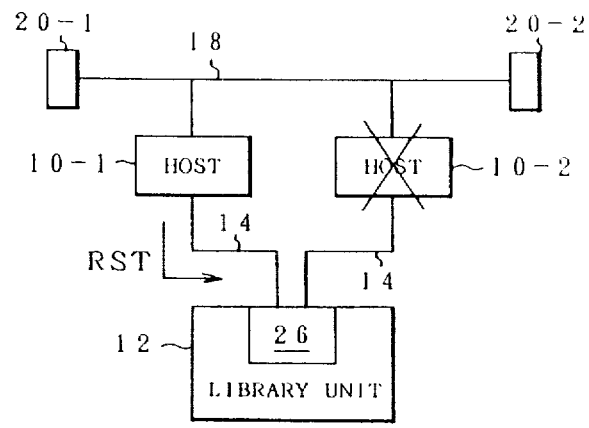
Figure 11D:
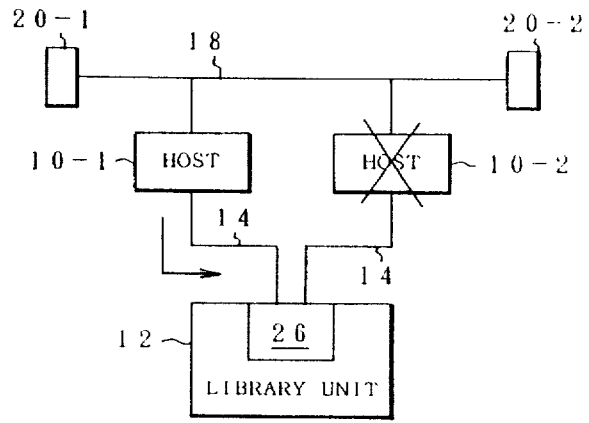

When no data is available against the data transfer request because of hang-up of the host computer 10-2, the host computer 10-1 forcedly issues a reset signal RST to the SCSI controller 26 of the library unit 12 to cause bus reset, thus releasing the library unit 12, as shown in FIG. 11C. After release by bus reset, the request from the host computer 10-1 is accepted by the SCSI controller 26 of the library unit 12, so that the host computer 10-1 occupies the SCSI controller 26 to conduct input/output processing relative to the library unit 12, as shown in FIG. 11D.

Figure 12:
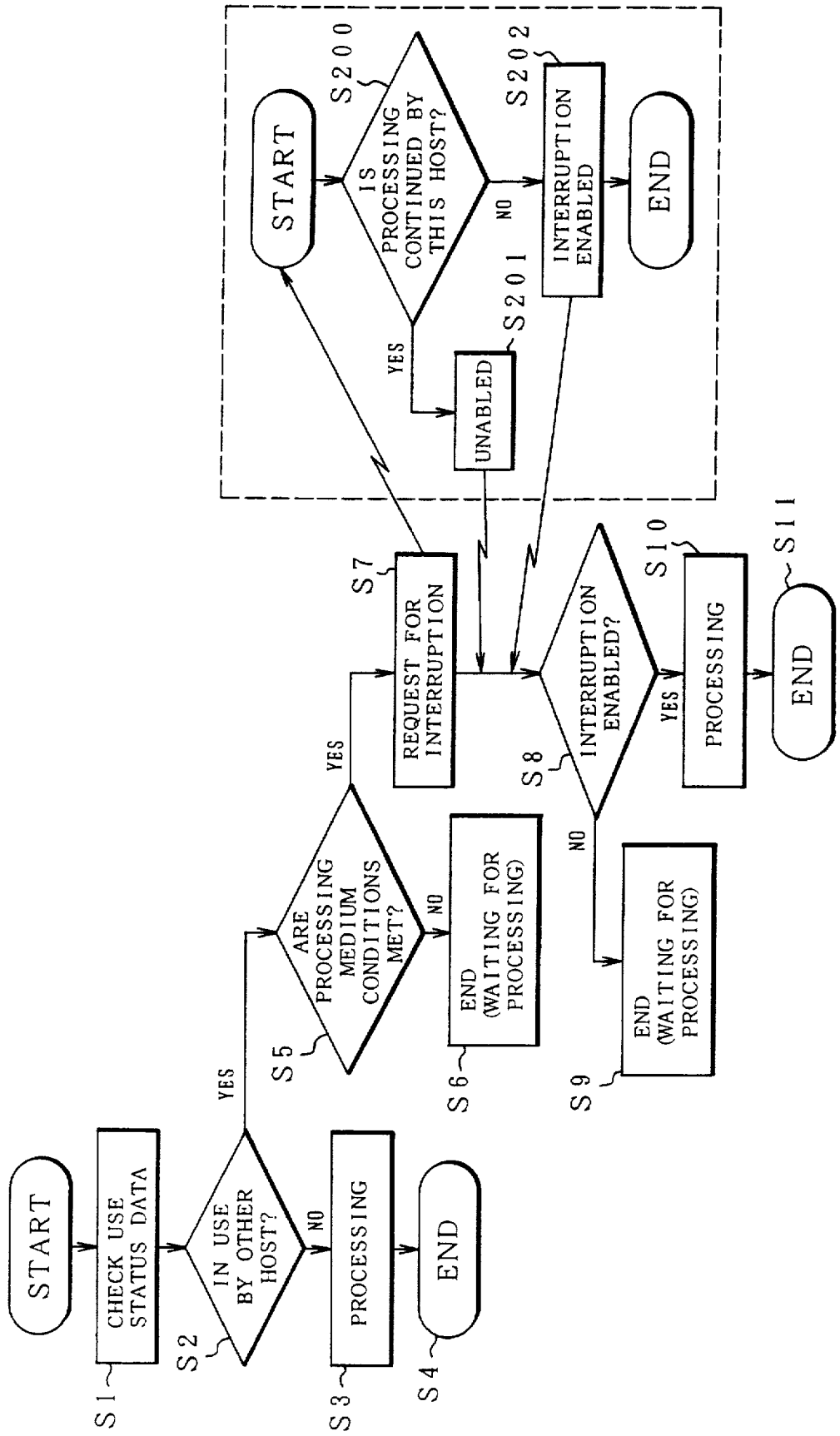
FIG. 12 is a flowchart of a second embodiment of the monitoring control processing in the present invention.
Figure 13:
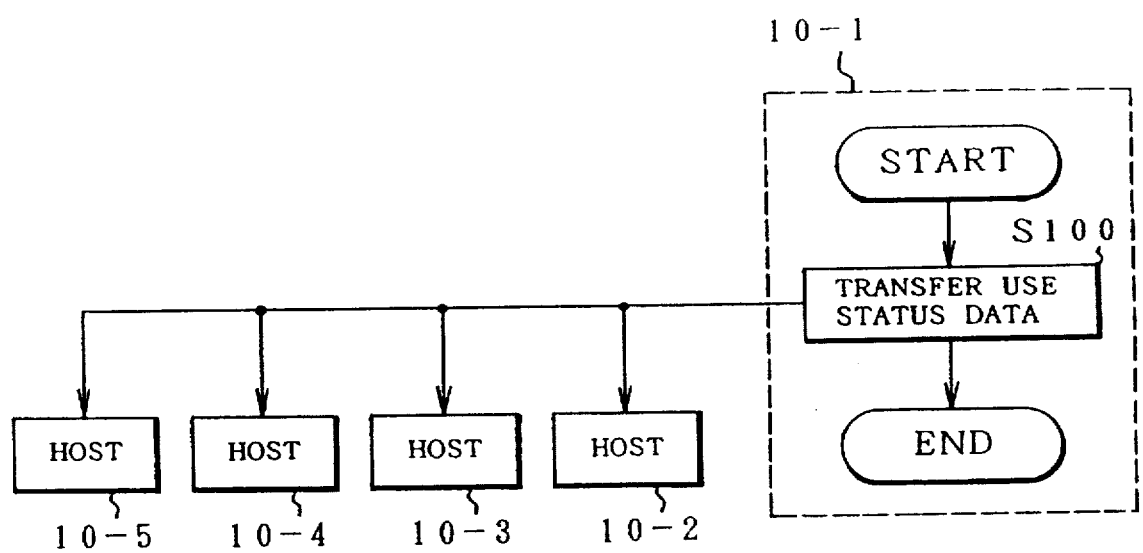
FIG. 13 is a descriptive view of transfer processing of use status data between hosts in FIG. 12.

The flowchart of FIG. 12 covers a second embodiment of data processing of the present invention. The second embodiment is, as shown in FIG. 13, characterized in that, for every input/output request by the host computer 10-1, for example, to the library unit 12, the use status data regarding the SCSI controller is transferred at Step S100 to all the other host computers 10-2 to 10-5, for example. Therefore, each of the host computers 10-1 to 10-5 is provided with storage areas of use status data of the SCSI controller for the other individual host computers. When an input/output request to the library unit is responded with busy, therefore, it is possible to recognize the use status of the SCSI controller by any other host computer by checking this use status data, and to perform an interruption processing based on bus reset or a determination as to whether or not the processed medium is the same.

FIG. 12 shows processing upon occurrence of an input/output request by the host computer 10-1. First, at Step S1, the use status data of the controller 26 of the library unit 2 transferred from the other host computer 10-2 is checked up. When the controller 26 is not in use by any other host computer, as confirmed at Step S2, input/output processing is performed at Step S3 by occupying the SCSI controller 26 of the library unit 12, and the processing normally comes to an end at Step S4.

When it is recognized at Step S2 that the other host computer 10-2 is using the library unit 12, it is checked up whether or not the conditions for the processed medium are the same, i.e., whether or not the host computer 10-2 is currently using the same medium as that the host computer 10-1 is desiring to use. If not the same medium, processing ends at Step S6, and the completion of processing by the host computer 10-2 is waited for. When the medium is the same, on the other hand, the host computer 10-1 issues an interruption request for using the same medium to the other host computer 10-2 at Step S7. In response to this interruption request, interruption processing of the other host computer 10-2 is started, to check up whether or not to continue processing for the medium currently under processing by itself at Step S200. If to continue, interruption disabled is responded at Step S201. If not to continue, an interruption authorization is issued at Step S202.

The host computer 10-1 having made an interruption request at Step S7 checks up interruption authorization or not from the other host computer 10-2 at Step S8, and if not authorized, discontinues processing at Step S9 to wait for the completion of processing by the host computer 10-2. If interruption is authorized, the host computer 10-1 issues a read command or a write command with the medium currently set on the drive of the library unit 12 as the object at Step S10 to execute read or write processing. Upon receipt of a response of completion, the host computer 10-1 issues a move command to take the medium from the drive back to the original position of the cell block, and finishes a series of operations at Step S11.

According to the present invention, as described above, when a plurality of initiators share a target, each initiator can recognize the current status of the other initiator occupying the target. As a result, occupation caused by hang-up of the initiator can be clearly discriminated from occupation caused by transfer of a large volume of data for a long period of time, thus ensuring safe bus reset.

Each initiator can be aware of the status of processing of the target by any other initiator including the medium currently processed of the library unit, for example. If an input/output request is made for the same medium as that currently processed by any other initiator, the move of the medium can be minimized in the library unit through interruption, thus improving the processing performance of the library unit on the target side by initiators.

In the embodiments described above, library units used in a server client system and a multi-host computer system have been used as examples. The present invention is not however limited to these embodiments, but is directly applicable for any appropriate system so far as a plurality of higher-level units share a library unit and the higher-level units and the library unit are connected by means of an SCSI system.

The present invention is not limited by any of the numerical values presented in the embodiments. In addition, the same effects are available by the application of the present invention in the case where a plurality of higher-level units share, not only a library unit, but also a printer exclusively for quantity printing, or a large-capacity storage unit.

What is claimed is:

1. A data processing system which comprises:

a plurality of higher-level units;

a library unit provided under said plurality of higher-level units and shared as an input/output unit by said plurality of higher-level units;

a lower-level interface which provides an interface control section for each of said plurality of higher-level units and said library unit, and exchanges information and data by connecting said individual interface control sections by means of an interface bus:

higher-level communication units which connect said plurality of higher-level units and exchange information regarding a status of use of said library unit; and monitoring control sections provided for each of said plurality of higher-level units, wherein said monitoring control sections instruct said lower-level interface to perform necessary processing in response to said status of use of said library unit acquired by a use of said higher-level communication units and, upon recognition of an abnormal occupation of said library unit by any other higher-level units, instructs said lower level interface to reset said occupation.

2. A data processing system according to claim 1, wherein:

said lower-level interface which provides an SCSI controller for each of said plurality of higher-level unit, as an initiator, and said library unit, as a target, and connects said SCSI controllers by means of an SCSI bus.

3. A data processing system according to claim 1, wherein:

said monitoring control section of each of said higher-level units, upon occurrence of an input/output request to a particular medium of said library unit, determines whether or not the other unit currently occupying the library unit is accessing the same medium, and if accessing the same medium, and an authorization of interruption is received upon request for interruption to the other higher-level unit, performs interruption processing of said input/output request for the same medium to said library unit.

4. A data processing system according to claim 3, wherein:

said monitoring control section of each of said higher-level units, upon receipt of an interruption request for accessing the same medium from any other higher-level unit during occupation of a particular medium of said library unit based on an input/output request, responds to the other higher-level unit with non-authorization of interruption when continuing processing of the same medium, and responds with authorization of interruption when finishing current processing.

5. A data processing system according to claim 1, wherein:

said higher-level communication unit of said higher-level unit, upon receipt of a transfer request from any other higher-level unit, transmits information showing the use status of said library unit by itself.

6. A data processing system according to claim 1, wherein:

said higher-level communication unit of said higher-level unit transfers information showing the status of use of said library unit to all the other higher-level units for every input/output request made to said library unit from any other higher-level unit.

7. A data processing system according to claim 1, wherein:

said higher-level communication unit of said higher-level unit uses a communication network built by mutually connecting a plurality of higher-level units as communication terminals.

8. A data processing system according to claim 1, wherein:

said higher-level communication unit of said higher-level unit uses a special communication network connecting a plurality of higher-level units.

9. A data processing system according to claim 1, wherein:

said plurality of higher-level units are server units of a server client system built by connecting one or more client units and a plurality of server units by means of a network.

10. A data processing system according to claim 1, wherein:

said plurality of higher-level units are host computers sharing said library unit as a common input/output unit.

11. A data processing system according to claim 1, wherein:

said library unit is provided with at least one or more recording/reproducing unit, a cell block housing a plurality of storage media, and a changer mechanism which transports and exchanges a storage medium between said recording/reproducing unit and said cell block.

12. A data processing system according to claim 1, wherein:

said library unit uses a magnetic tape cartridge as a storage medium.

13. A data processing system according to claim 1, wherein:

said library unit uses an optical disk cartridge as a storage medium.

14. A data processing system which comprises:

a plurality of higher-level units;

a library unit provided under said plurality of higher-level units and shared as an input/output unit by said plurality of higher-level units;

a lower-level interface which provides an interface control section for each of said plurality of higher-level units and said library unit, and exchanges information and data by connecting said individual interface control sections by means of an interface bus;

higher-level communication units which connect said plurality of higher-level units and exchange information regarding a status of use of said library unit; and monitoring control sections provided for each of said plurality of higher-level units, said monitoring control units instruct said lower-level interface to perform necessary processing in response to said status of use of said library unit acquired by a use of said higher-level communication units, wherein upon an occurrence of an input/output request to a particular medium of said library unit, said monitoring control unit determines whether or not a first higher-level unit currently occupying said library unit is accessing said particular medium, and, if said first higher-level unit is accessing said particular medium and an authorization interruption is received, upon request for interruption to said first higher-level unit, said monitoring control section performs interruption processing of said input/output request for said particular medium to said library unit, and wherein upon receipt of said interruption request for accessing said particular medium from a second higher-level unit during occupation of said particular medium of said library unit based on an input/output request, said monitoring control section responds to said second higher-level unit with non-authorization of interruption when continuing processing of said particular medium, and responds with authorization of interruption when current processing is finished.

15. A data processing system which comprises:

a plurality of higher-level units;

a library unit provided under said plurality of higher-level units and shared as an input/output unit by said plurality of higher-level units;

a lower-level interface which provides an interface control section for each of said plurality of higher-level units and said library unit, and exchanges information and data by connecting said individual interface control sections by means of an interface bus;

higher-level communication units which connect said plurality of higher-level units and transfers information regarding a status of use of said library unit to all said other higher-level units for every input/output request made to said library unit from any other higher-level unit; and monitoring control sections, each provided for each of said plurality of higher-level units, which instruct said lower-level interface to perform necessary processing in response to said status of use of said library unit acquired by the use of said higher-level communication units.

* * * * *

UNITED STATES PATENT AND TRADEMARK OFFICE
CERTIFICATE OF CORRECTION

PATENT NO. : 5,594,922
DATED : January 14, 1997
INVENTOR(S) : Suzuki et al.

It is certified that error appears in the above-indentified patent and that said Letters Patent is hereby corrected as shown below:

Column 2, line 3, delete "busy" (first occurrence).

Column 3, line 32, delete "accu-" and insert --to--.

Column 3, line 66, delete "lid" and insert --11D--.

Column 4, line 61, delete "desctiptor" and insert --descriptor--.

Column 6, line 41, delete "cart led" and insert --carried--.

Column 8, line 18, delete "us" and insert --use--.

Signed and Sealed this

Thirtieth Day of September, 1997

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,594,922
DATED : January 14, 1997
INVENTOR(S) : Suzuki et al.

It is certified that error appears in the above-identified patent and that said Letters Patent is hereby corrected as shown below:

Column 2, line 3, delete "busy" (first occurrence).

Column 3, line 32, before "accu-", insert --to--.

Column 3, line 66, delete "lid" and insert --11D--.

Column 4, line 61, delete "desctiptor" and insert --descriptor--.

Column 6, line 41, delete "cart led" and insert --carried--.

Column 8, line 18, delete "us" and insert --use--.

This certificate supersedes Certificate of Correction issued September 3, 1997.

Signed and Sealed this

Thirtieth Day of December, 1997

Attest:

BRUCE LEHMAN

Attesting Officer

Commissioner of Patents and Trademarks